UNITED STATES PATENT OFFICE.

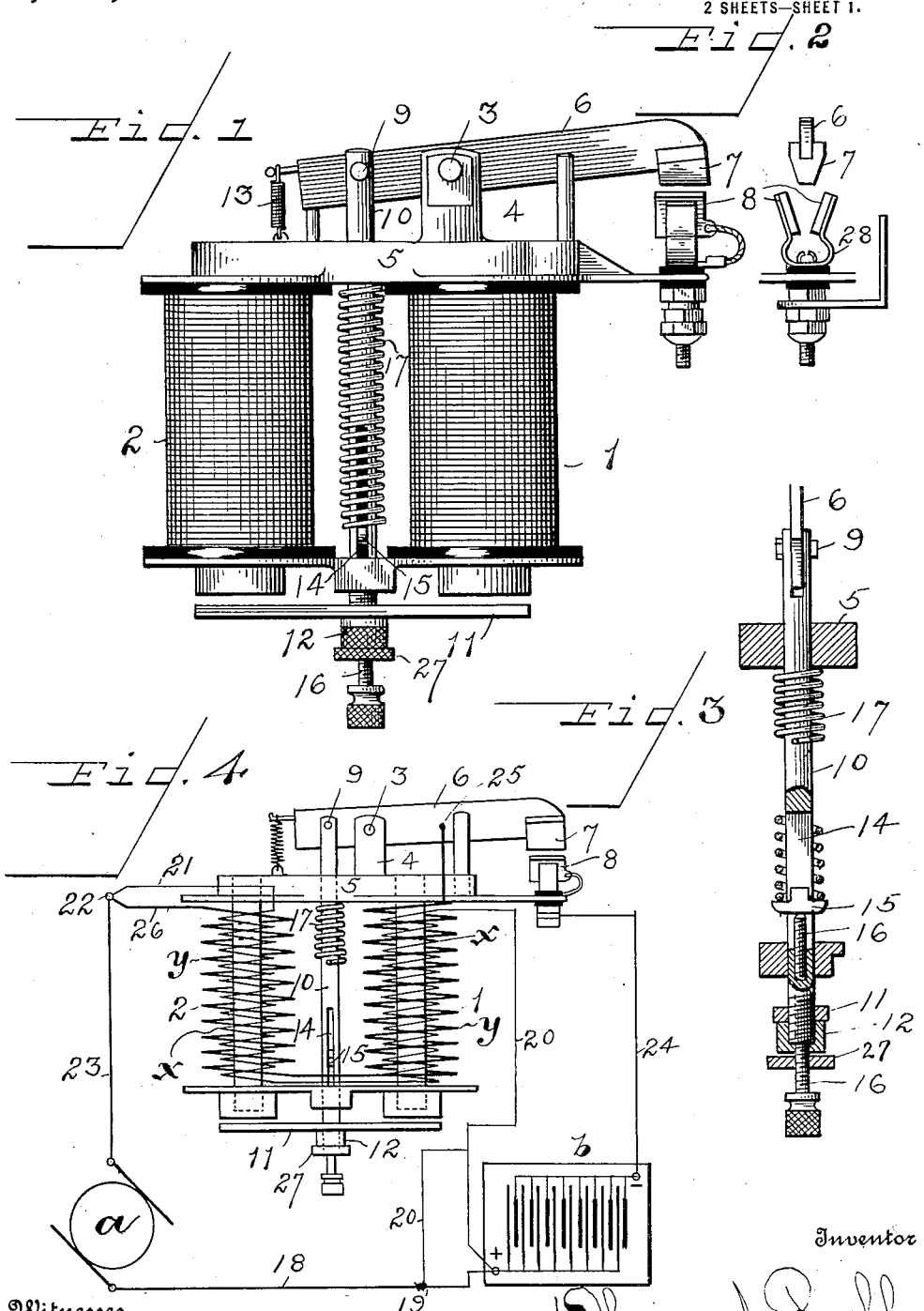

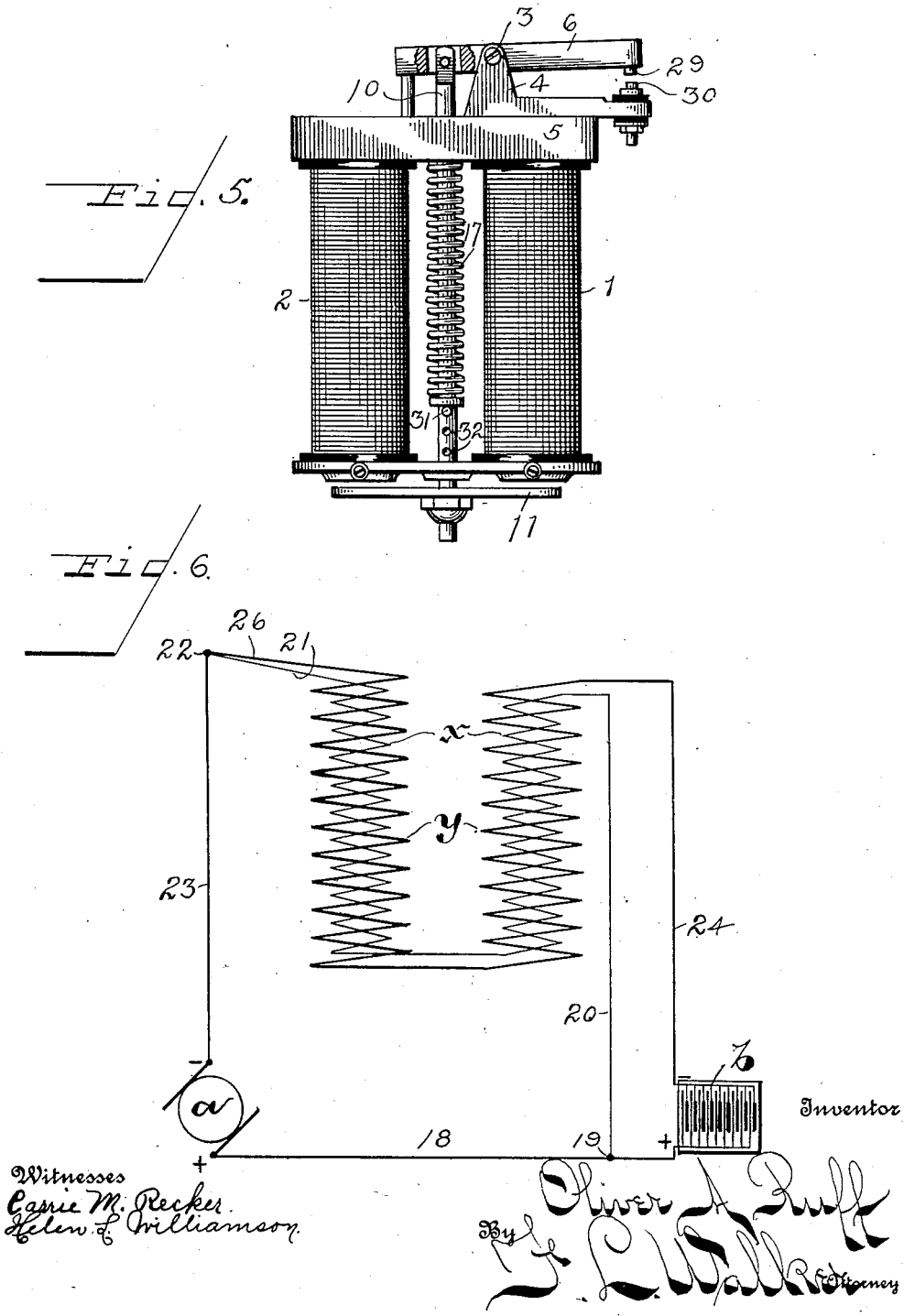

OLIVER AMOS RUFF, OF DAYTON, OHIO, ASSIGNOR TO WILLIAM V. KNOLL, RECEIVER FOR THE DAYTON ELECTRICAL MANUFACTURING COMPANY, OF DAYTON, OHIO, A CORPORATION.

AUTOMATIC CUT-OUT.

1,293,205.  Specification of Letters Patent.  Patented Feb. 4, 1919.

Application filed February 23, 1915. Serial No. 9,957.

*To all whom it may concern:*

Be it known that I, OLIVER A. RUFF, citizen of the United States, residing at Dayton, in the county of Montgomery and State of Ohio, have invented certain new and useful Improvements in Automatic Cut-Outs, of which the following is a specification.

My invention relates to an automatic cut out for electrical circuits and is especially adapted for use in the charging circuit of a storage battery but is equally applicable to electric circuits for other purposes.

The object of the invention is to provide in an electric circuit having two available sources of electric energy, one of which is of normally high potential and the other of low potential, means for automatically breaking the circuit when the voltage of the normally high potential source falls below that of the normally low potential source.

As applied to a storage battery circuit, the object of the invention is to prevent the short circuiting of the battery through the generator when the voltage of the latter drops below that of the battery.

Further object of the invention is to simplify the structure as well as the means and mode of operation of such devices whereby they will not only be cheapened in construction, but will be more efficient in use, positive in action, quick in operation, and unlikely to get out of repair.

A further object of the invention is to provide improved means for controlling the make and break of the contact and to provide regulating means therefor whereby the differential necessary to cause the operation of the device may be varied.

With the above primary and other incidental objects in view, as will more fully appear in the specification, the invention consists of the features of construction, the parts and combinations thereof, and the mode of operation, of their equivalents, as hereinafter described and set forth in the claims.

Referring to the drawings, Figure 1 is a side elevation of the assembled automatic cut out mechanism forming the subject matter hereof. Fig. 2 is a detailed end view of the contact shown at the right in Fig. 1. Fig. 3 is a detail view of the variable control features by which the movement of operation in relation to the varying potential can be regulated. Fig. 4 is a diagrammatic view of the cut out mechanism and the circuit. Fig. 5 is a side elevation of a modification of the construction shown in Fig. 1. Fig. 6 is a detail circuit diagram.

Like parts are indicated by similar characters of reference throughout the several views.

The cut out mechanism, forming the subject matter hereof, is an improvement upon the cut out device disclosed in U. S. Patent to Monroe S. Clawson, No. 666920, issued January 29, 1901.

The automatic cut out mechanism is so arranged that so long as the electromotive force of the primary source of energy, such as the generator, exceeds that of the secondary source, such as the storage battery, the cut out mechanism will maintain a closed circuit between the generator and the storage battery whereby the battery will be charged by the operation of the generator. When, however, for any reason the voltage of the primary source or generator falls below that of the secondary source or battery there will occur a momentary counter flow of current from the battery through the coils of the cut out mechanism due to the short circuiting of the battery through the generator. This counter flow of current from the battery through the cut out mechanism will cause the generator to be automatically disconnected. When the potential of the generator again exceeds that of the battery or secondary source, the circuit between the generator and the battery will be again automatically closed and the charging of the battery continued. The regulating mechanism affords means by which the degree of voltage at which the generator is cut out or brought into the battery current may be varied at will.

As illustrated in the drawings, the cut out mechanism embodies an electromagnet comprising two coils 1 and 2 each of which is double wound in the same direction, one winding being preferably with light wire and the other with comparatively heavy wire, as shown in detail in the diagrammatic view, Fig. 4. The corresponding windings of the two coils are connected in series as shown in said diagram.

Pivotally mounted at 3 to a suitable support 4 carried by the head 5 of the electromagnet is an oscillatory switch arm or blade 6 having at its outer end a contact head 7 adapted to engage within the jaws 8 of a corresponding contact when the arm or blade 6 is oscillated downward. Pivoted to the oscillatory arm 6 at the point 9 is the upper end of the reciprocatory stem or rod 10 which, at its lower end, is secured to the armature 11. The lower end of the stem or rod 10 is preferably screw threaded and the armature 11 is preferably provided with the centrally disposed screw threaded opening in which the screw threaded end of the stem or rod 10 is engaged. The armature is securely locked in its adjusted position by a lock nut 12 screw threaded upon the protruding end of the stem or rod 10. The construction is such that when the coils 1 and 2 of the electromagnet are energized the attraction of the armature 11 by the said magnet will reciprocate the rod 10 to cause an oscillatory movement of the switch arm or blade 6, causing the head 7 thereof to be thrust within the jaws 8 of the opposing contact and thereby close an electrical circuit of which the arm 6 and the jaws 8 form a part. The oscillatory arm 6 is provided at its rear end with a retracting spring 13 attached at its lower end to the head 5 of the magnet and at its upper end to a pin projecting from the rear end of the arm 6. The stem or rod 10 is slotted throughout a portion of its length, as at 14, and mounted within the slot 14 is a sliding cross head
15. The lower end of the stem or rod 10 is provided with a longitudinal bore intersecting the slot 14. An adjusting screw 16 introduced through the longitudinal bore of the stem or rod 10 and screw threaded in the lock nut 12 projects within the slot 14 and engages the cross head 15 therein, as shown in detail in Fig. 3. Surrounding the stem or rod 10 and interposed between the cross head 15 and the head 5 of the electromagnet is a helical compression spring 17 which bears at one end upon the head 5 and at its opposite end upon the cross head 15. By the adjustment of the screw 16 the cross head 15 is adjusted upward or downward within the slot 14 thereby varying the tension of the compression spring 17. By forcing the cross head upward within the slot 14 the tension of the spring 17 is increased thereby necessitating a greater degree of electromotive power to cause the electromagnet to attract its armature against the tension of the spring 17, the tension of which must be overcome by the attractive power of the electromagnet.
By adjusting the cross head 15 downward within the slot the tension will be relieved upon the spring 17 thereby necessitating less electromotive power to cause the magnet to overcome the tension of the spring and attract the armature. As before stated the attraction of the armature by the electromagnet causes the oscillation of the switch arm or blade 6 to close the contact with the contact jaws 8. Referring to the diagrammatic view, Fig. 4, it will be noted that the high resistance winding $x$ of the magnet is connected permanently in the circuit with the generator. Tracing this circuit and beginning at the positive side of the generator, the current passes from the generator through the line 18 to the point 19, then through the line 20 to the high resistance windings $x$ of the coils 1 and 2, thence through the line 21 to the point 22 and through the common return line 23 to the negative side of the generator. This is a permanent circuit which serves to excite or energize the magnet whenever the generator is in operation. Whenever the voltage or potential of the generator is sufficient to cause the attractive power of the magnet to overcome the tension of the spring 17, the armature 11 is attracted and the arm or blade 6 is oscillated to cause the head 7 to engage the jaws 8. This closes a circuit through the battery $b$ and the low resistance windings of the coils 1 and 2. The current then flows from the positive side of the generator through the line 18 to the battery $b$, thence from the battery through the line 24 to the contact jaws 8, thence through the head 7 maintained in contact with the jaws 8 by the action of the electromagnet, and through the arm 6, to which the terminal of the low resistance winding of the magnet coils is attached at 25. The current then passes from the arm 6 through the low resistance windings of the coils 1 and 2 and through the line 26 to the point 22 and then through the common return line 23 to the generator. However, should the potential of the generator $a$ fall below that of the battery $b$ and the head 7 of the arm 6 still remain in contact with the jaws 8, a counter current will pass from the positive side of the battery through the line 18 to the generator, thence through the generator and line 23 to the point 22, then through the line 26 to the low resistance winding $y$ of the coils and from the coils to the point 25 upon the arm 6 and thence through the contacts 7 and 8 and return to the battery through the line 24. This reversal of the current will be only momentary and will not be sufficient to damage the generator but will reverse the polarity of the electromagnet causing the armature 11 to be repelled thereby. The repulsion of the armature 11 assisted by the springs 13 and 17 will cause the arm 6 to be subsequently moved upward to break the contact between the head 7 and the jaws 8 and so interrupt the battery circuit. It will be understood that this reversal of the direction of current and consequent change of polarity to effect the breaking of the 13 circuit occurs almost instantly. When the voltage of the generator again increases the electromagnet is again excited and when its attractive force is sufficient to overcome the spring 17 the low resistance circuit is again closed from the generator through the battery by the engagement of the head 7 with the jaws 8. The degree of voltage or potential necessary to cause the electromagnet to overcome the tension of the spring 17 is varied by the variation of the spring tension by means of the screw 16. Thus by adjusting the screw 16 to increase the tension of the spring 17 a higher voltage or potential of the generator will be required to energize the electromagnet sufficiently to overcome the spring tension. To the contrary, by decreasing the tension of the spring 17 the electromagnet is permitted to operate to close the battery circuit at a lower generator voltage or potential. The adjustment screw 16 is locked in its adjusted position by means of the lock nut 27. Referring to Fig. 2, it will be noted that the contact head 7 upon the arm 6 is beveled or V shaped while the jaws of the contact 8 are similarly inclined in relation one with the other and are supported upon resilient or yielding spring arms 28. There is thus provided at each operation a wiping action between the head 7 and jaws 8 while the spring arms 28 insure perfect contact between the parts.

In Fig. 5 there is shown a modification of the cut out mechanism illustrated in Fig. 1. The general construction of this modified form of cut out is the same as before described. It will be noted that the oscillatory arm 6 is provided with a flat contact point 29 engaging a similar flat contact point 30 carried upon the frame. The connection of the rod or stem 10 with the arm 6 is slightly modified. Whereas in the construction shown in Fig. 1 and Fig. 3 the upper end of the rod or stem 10 is bifurcated and the arm 6 extends through said bifurcation, in the modified form shown in Fig. 5 the arm 6 is provided with an opening or eye while the upper end of the rod or stem 10 is somewhat reduced and is extended into the opening or eye in the arm 6. In lieu of the adjusting screw 16 the lower end of the stem or rod 10 carries a transverse pin or stud 31 upon which the lower end of the tension spring 17 abuts. The stud 31 may be permanent, or it may be engaged in any one of a series of holes 32, in the stem or rod 10, as shown in Fig. 5. The construction shown in Fig. 5 is especially adapted for small devices whereas the construction of Fig. 1 is better adapted to large devices.

In Fig. 6 there is shown a circuit diagram independent of the operating parts of the mechanism.

From the above description it will be apparent that there is thus provided a device of the character described possessing the particular features of advantage before enumerated as desirable but which obviously is susceptible of modificaion in its form, proportion, detail construction or arrangement of parts without departing from the principle involved or sacrificing any of its advantages.

While in order to comply with the statute the invention has been described in language more or less specific as to certain structural features, it is to be understood that the invention is not limited to any specific details, but that the means and construction herein described comprise but one mode of putting the invention into effect and the invention is therefore claimed broadly in any of its possible forms or modifications within the scope of the appended claims.

Having thus described my invention, I claim:

1. In an automatic electrical cut out of the class wherein there is employed an electric circuit including a current supply and a current receiving element, and an electromagnet having double windings, one winding of which is permanently connected in the circuit, the other winding being adapted to be intermittently connected in said circuit, and a movable armature for said electromagnet, attracted by the circulation of current through the permanently connecting winding and repelled by the circulation of current through the intermittently connected winding, characterized by a vibratory switch controlling said intermittently connected winding, a reciprocatory link connecting the vibratory switch with the movable armature for simultaneous movement, a helical spring against the tension of which the armature moves to close said switch, and means to vary the tension of the spring to correspondingly vary the interval of intermittent connection of the intermittently connected winding.

2. In an automatic electrical cut out, wherein an electric circuit including a current supply and a current receiving element, also includes an electro-magnet having a winding permanently connected in said circuit, and further having an intermittently closed shunt winding also connecting the supply and receiving elements independent of said permanent connection, the combination of a movable switch member adapted to intermittently close said shunt winding, an armature movable under the influence of the permanently connected electro-magnet winding, an operating connection between the armature and the switch member whereby said members operate in unison, a spring against the tension of which the armature is attracted, and means for varying the tension of the spring to likewise vary the interval of intermittent connection of the shunt circuit.

3. In an automatic cut out, wherein a permanently closed circuit including a source of current supply and a current consuming element, also includes an electro-magnet having a winding permanently in said circuit, a movable armature for the magnet, an intermittently closed shunt winding also connecting said source of supply and consuming element, and having a contact member controlled by the movement of the armature to open and close the shunt winding, characterized by a reciprocatory rod connected to the armature, a tension spring, a fixed abutment for one end of the spring, a movable abutment moving in unison with the rod engaged by the other end of the spring whereby the movement of the armature and contact will be effected against the tension of the spring, and means to adjust the movable abutment independent of the movement of the armature.

4. In an automatic electrical cut out, of the class wherein an electric circuit including a current supply and a current receiving element, also includes an electro-magnet having double windings one winding of which is permanently connected in the circuit, the other winding being adapted to be intermittently connected in said circuit, and a movable armature for said electro-magnet, attracted by the circulation of current through the permanently connected winding, a pivoted switch arm controlling the intermittently connected winding, the combination in such an apparatus of a reciprocatory rod connecting the switch arm and the armature, a helical spring surrounding said reciprocatory rod, a fixed abutment for one end of said helical spring, and an adjustable abutment carried by the rod and engaged by the opposite end of the spring, and means for varying the adjustable abutment to vary the tension of the spring independent of the movement of the armature.

5. In an automatic electrical cut out, wherein an electric circuit including a current supply and a current receiving element, also includes an electro-magnet having double windings one winding of which is permanently connected in the circuit, and the other winding is adapted to be intermittently connected in said circuit, by the operation of a movable armature for said electro-magnet, attracted by the circulation of current through the permanently connected winding, characterized by a movable contract controlling the intermittently connected winding, and actuated by the movement of the armature, a reciprocatory rod connected to said armature, said rod having a longitudinally disposed slot therein, a cross head movably mounted in said slot, adjusting means for the cross head, a tension spring engaging said movable cross head at one end, and a fixed abutment for the opposite end of the spring.

6. The combination with an electromagnet of a movable armature, a contact member controlled by the movement of the armature to open or close an electric circuit, a reciprocatory rod connected to the armature, a helical spring surrounding the rod, a fixed abutment engaged by one end of the spring, the rod being provided with a transverse opening, and a transverse bearing member adjustable longitudinally within the limits of said opening extended through said opening and engaged by the opposite end of the spring, and means for adjusting said transverse bearing member longitudinally within the limits of said opening.

7. The combination with an electromagnet of a movable armature, a contact member controlled by the movement of the armature to open or close an electric circuit, a reciprocatory rod connected to the armature, said rod being provided with a longitudinal slot therein, an adjustable bearing head in said slot, a tension spring bearing at one end on said adjustable head and a fixed abutment for the opposite end of the spring, and means for adjusting said bearing head longitudinally within said slot.

8. The combination with an electromagnet of a movable armature, a contact member controlled by the movement of the armature to open and close an electric circuit, a reciprocatory rod connected to the armature, and having a longitudinally disposed recess therein, and further provided with a longitudinal bore intersecting said recess, a head adjustably mounted in the recess, an adjusting member introduced through the longitudinal bore in the rod and controlling the adjustable head, and a tension spring having a fixed abutment at one end and bearing upon said head at its opposite end.

In testimony whereof, I have hereunto set my hand this 10th day of February, A. D. 1915.

OLIVER AMOS RUFF.

Witnesses:
HARRY F. NOLAN,
CARRIE M. RECKER.